(12) United States Patent
Yasuda et al.

(10) Patent No.: US 11,077,998 B2
(45) Date of Patent: Aug. 3, 2021

(54) PACKAGING BAG AND MANUFACTURING METHOD THEREFOR

(71) Applicant: KYODO PRINTING CO., LTD., Tokyo (JP)

(72) Inventors: Atsushi Yasuda, Tokyo (JP); Yuki Narita, Tokyo (JP); Masa Inoue, Tokyo (JP)

(73) Assignee: KYODO PRINTING CO., LTD., Tokyo (JP)

( * ) Notice: Subject to any disclaimer, the term of this patent is extended or adjusted under 35 U.S.C. 154(b) by 14 days.

(21) Appl. No.: 16/478,636

(22) PCT Filed: Jan. 18, 2018

(86) PCT No.: PCT/JP2018/001430
§ 371 (c)(1),
(2) Date: Jul. 17, 2019

(87) PCT Pub. No.: WO2018/135591
PCT Pub. Date: Jul. 26, 2018

(65) Prior Publication Data
US 2019/0344945 A1    Nov. 14, 2019

(30) Foreign Application Priority Data

Jan. 20, 2017  (JP) .............................. JP2017-009003

(51) Int. Cl.
*B32B 27/32* (2006.01)
*B65D 65/40* (2006.01)
(Continued)

(52) U.S. Cl.
CPC ............... *B65D 65/40* (2013.01); *B32B 7/12* (2013.01); *B32B 15/09* (2013.01); *B32B 15/20* (2013.01);
(Continued)

(58) Field of Classification Search
CPC ........ B65D 65/40; B65D 81/264; B32B 7/12; B32B 15/09; B32B 15/20
(Continued)

(56) References Cited

U.S. PATENT DOCUMENTS 5,820,956 A * 10/1998 Hatakeyama ........... B32B 27/18
428/36.6
10,239,680 B2   3/2019 Koizumi et al.
(Continued)

FOREIGN PATENT DOCUMENTS

EP           2612824 B1    5/2020
JP       2009-40439 A    2/2009
(Continued)

OTHER PUBLICATIONS

International Search Report dated Feb. 13, 2018 issued in corresponding PCT/JP2018/001430 application (2 pages).
(Continued)

*Primary Examiner* — Ellen S Hock
(74) *Attorney, Agent, or Firm* — Millen White Zelano & Branigan, PC; Brion P. Heaney (57) ABSTRACT

A packaging bag 100 having a heat-sealed part at an end and thereby formed into a bag shape, wherein the heat-sealed part 110 has an oxygen absorption layer 10, a water-vapor absorption layer 20, and a barrier layer 30, and wherein the oxygen absorption layer 10 contains an oxygen-deficient cerium oxide 11.

14 Claims, 3 Drawing Sheets

(51) Int. Cl.
  *B32B 7/12*    (2006.01)
  *B32B 15/09*   (2006.01)
  *B32B 15/20*   (2006.01)
  *B32B 27/36*   (2006.01)
  *B65D 81/26*   (2006.01)

(52) U.S. Cl.
  CPC .............. *B32B 27/32* (2013.01); *B32B 27/36* (2013.01); *B65D 81/264* (2013.01); *B65D 81/266* (2013.01); *B32B 2307/31* (2013.01); *B32B 2307/74* (2013.01); *B32B 2439/46* (2013.01)

(58) Field of Classification Search
  USPC ................................................ 428/34.1, 35.3
  See application file for complete search history.

(56) References Cited

U.S. PATENT DOCUMENTS

| | | | |
|---|---|---|---|
| 2004/0023054 A1* | 2/2004 | Wolak | B29C 65/18 428/515 |
| 2016/0325909 A1 | 11/2016 | Niimi et al. | |
| 2017/0341351 A1 | 11/2017 | Iwasaki et al. | |

FOREIGN PATENT DOCUMENTS

| | | | |
|---|---|---|---|
| JP | 2010099875 | * | 5/2010 |
| JP | 2011115984 | A | 6/2011 |
| JP | 2014-46587 | A | 3/2014 |
| JP | 2017-7689 | A | 1/2017 |
| WO | 15141558 | A1 | 9/2015 |
| WO | 2016/013595 | A1 | 1/2016 |
| WO | 2016/063987 | A1 | 4/2016 |

OTHER PUBLICATIONS

English Machine Translation and Abstract of JP 2009-040439 A published Feb. 26, 2009.
English Machine Translation and Abstract of JP 2014-046587 A published Mar. 17, 2014.
English Machine Translation and Abstract of WO 2016/013595 A1 published Jan. 28, 2016.
English Machine Translation and Abstract of JP 2017-007689 A published Jan. 12, 2017.
Office Action dated Nov. 10, 2020, in corresponding Japanese Patent Application No. 2017-009003 (pp. 1-5). English.
Search Report dated Aug. 27, 2020, for corresponding European Patent Application No. 18741059.2 (pp. 1-8).

* cited by examiner

PACKAGING BAG AND MANUFACTURING METHOD THEREFOR

FIELD

The present invention relates to a packaging bag and a manufacturing method therefor.

BACKGROUND

In the fields of foodstuffs, medicine, medical equipment, medical instruments, electronic components, precision machines, and recording materials, articles are stored and preserved in packaging bags having water vapor absorption capacity and oxygen absorption capacity to prevent quality deterioration due to moisture and oxygen, and packaging bags therefor have been proposed.

For example, Patent Literature 1 describes a laminate film obtained by laminating a sealant film and a functional porous body, and a packaging bag obtained from the laminate body. The functional porous body may carry a functional substance selected from the group consisting of a combination of particles exhibiting a deodorant effect and a resin component, a combination of particles exhibiting an oxygen absorption effect and a resin component, and a combination of particles exhibiting a water vapor absorption effect and a resin component. Patent Literature 1 further describes, as the particles exhibiting an oxygen absorbing effect, inorganic oxides such as cerium oxide, and organic mixtures comprising ethylenic unsaturated hydrocarbons, and as the particles exhibiting a water vapor absorption effect, natural zeolite and synthetic zeolite.

Patent Literature 2 describes an oxygen- and moisture-absorbing pouch in which a moisture-absorbing laminate and an oxygen-absorbing laminate are used. The moisture-absorbing laminate comprises, for example, a desiccant such as a zeolite. The oxygen-absorbing laminate comprises, for example, an oxidizable resin such as an ethylenic unsaturated hydrocarbon polymer, and, for example, a transition metal catalyst such as cobalt neodecanoate.

CITATION LIST

Patent Literature

[Patent Literature 1] JP 2014-46587
[Patent Literature 2] JP 2009-40439

SUMMARY

Technical Problem

When both oxygen and water vapor are removed, oxygen absorbents which require the presence of moisture to absorb oxygen, e.g., iron-based oxygen absorbents, cannot be used. In this case, it is necessary that an oxygen absorbent which can absorb and remove oxygen even under low humidity conditions without requiring moisture mediation be used. As such an oxygen absorbent, organic absorbents have been considered.

However, since organic oxygen absorbents are likely to bleed out when mixed in a film and may adhere to and contaminate contents during use, organic oxygen absorbents are not preferable.

The packaging bag and pouch described in Patent Literatures 1 and 2 above are considered to have oxygen absorption and removal functions without requiring moisture mediation. However, the technology described in Patent Literature 1 is not designed to absorb and remove both oxygen and water vapor simultaneously, and a specific configuration therefor is not disclosed. The oxygen absorption capacity of the pouch described in Patent Literature 2 is insufficient. In order to exhibit an oxygen absorption function, it is necessary to irradiate the inside of the pouch with ultraviolet light, which is labor intensive.

Oxygen-deficient cerium oxide as an oxygen absorbent which can quickly absorb and remove oxygen even under low humidity conditions is known.

In packaging bags obtained using a film comprising oxygen-deficient cerium oxide as the oxygen absorbent, oxygen invades from the edge of a heat seal part toward the interior of the packaging bag, and the oxygen absorption activity of the oxygen deficiency cerium oxide is inactivated, whereby the problem of so-called "edge inactivation" occurs. In particular, in the case of packaging bags including easy-peel sealant layers, edge inactivation becomes noteworthy. When the edge of the packaging bag is inactivated and the heat seal part is breached, oxygen may invade into the interior of the packaging bag.

The present invention has been achieved in light of the above circumstances. The object of the present invention is to provide a packaging bag which can absorb and remove both oxygen and water vapor, and with which the problem of edge inactivation can be suppressed while maintaining an oxygen absorption capability even under low humidity conditions, and to provide a manufacturing method therefor.

Solution to Problem

The present invention is as described below.

[1] A packaging bag having on an edge thereof a heat seal part with which the packaging bag is formed into a bag shape, wherein
the heat seal part comprises an oxygen absorbing layer, a water vapor absorbing layer, and a barrier layer, and
the oxygen absorbing layer comprises an oxygen-deficient cerium oxide.

[2] The packaging bag according to [1], wherein the water vapor absorbing layer comprises a zeolite.

[3] The packaging bag according to [1] or [2], wherein the heat seal part comprises a barrier layer, an oxygen absorbing layer, a water vapor absorbing layer, and a barrier layer in this order.

[4] The packaging bag according to any one of [1] to [3], wherein the heat seal part includes a layer having an easy-peel function.

[5] The packaging bag according to any one of [1] to [4], wherein
an oxygen absorbing laminate film comprising a barrier layer and an oxygen absorbing layer, and
a water vapor absorbing laminate film comprising a barrier layer and a water vapor absorbing layer are arranged opposite to each other so that the oxygen absorbing layer and the water vapor absorbing layer are located inwardly, and edges of the oxygen absorbing laminate film and the water vapor absorbing laminate film are heat-sealed to form a bag shape.

[6] The packaging bag according to any one of [1] to [5], wherein a skin layer is included on one surface or both surfaces of the oxygen absorbing layer.

[7] The packaging bag according to any one of [1] to [6], wherein a skin layer is included on one surface or both surfaces of the water vapor absorbing layer.

[8] A method for manufacturing a packaging bag, comprising the steps of:
preparing an oxygen absorbing laminate film comprising a barrier layer and an oxygen absorbing layer, and a water vapor absorbing laminate film comprising a barrier layer and a water vapor absorbing layer,
arranging the oxygen absorbing laminate film and the water vapor absorbing laminate film opposite each other so that the oxygen absorbing layer and the water vapor absorbing layer are located inwardly, and
heat sealing the edges of the oppositely-arranged oxygen absorbing film and water vapor absorbing film to form a bag shape.

[9] A contents-containing packaging bag, comprising:
the packaging bag according to any one of [1] to [7], and contents which are sealed in the packaging bag.

[10] The contents-containing packaging bag according to [9], wherein the contents are a pharmaceutical or a medical instrument.

Advantageous Effects of Invention

According to the present invention, a packaging bag which can absorb and remove both oxygen and water vapor, and with which the problem of edge inactivation can be suppressed while maintaining an oxygen absorption capability even under low humidity conditions, and a manufacturing method therefor are provided.

The packaging bag of the present invention can maintain low oxygen and water vapor concentrations inside the bag, and thus, can be suitably used for the storage of contents such as, for example, foodstuffs, medicine, medical equipment, medical instruments, electronic components, precision machines, and recording materials.

DESCRIPTION OF EMBODIMENTS

<Packaging Bag>
The packaging bag of the present invention is:
a packaging bag having on an edge thereof a heat seal part with which the packaging bag is formed into a bag shape, wherein
the heat seal part comprises an oxygen absorbing layer, a water vapor absorbing layer, and a barrier layer, and
the oxygen absorbing layer comprises an oxygen-deficient cerium oxide.

The heat seal part of the packaging bag of the present invention may comprise a barrier layer, an oxygen absorbing layer, a water vapor absorbing layer, and a barrier layer in this order.

The heat seal part of the packaging bag of the present invention may further comprise a skin layer on one surface or on both surfaces of the oxygen absorbing layer, and may further comprise a skin layer on one surface or on both surfaces of the water vapor absorbing layer. A surface resin layer may be further included on one or both of the outermost layers.

The heat seal part of the packaging bag of the present invention may comprise a layer having an easy-peel function. In this case, the oxygen absorbing layer, the water vapor absorbing layer, and, when present, at least one of the skin layers may have an easy-peel function, or a layer having an easy-peel function other than these layers may be included.

In the packaging bag of the present invention, the oxygen absorbing layer comprises an oxygen-deficient cerium oxide. Thus, the oxygen absorbing layer can absorb oxygen without requiring moisture mediation. Therefore, the packaging bag of the present invention exhibits an excellent oxygen absorption capacity even under low humidity conditions. Labor-intensive activities such as ultraviolet irradiation are not necessary in order to demonstrate the oxygen absorption capacity.

By including both an oxygen absorbing layer and a water vapor absorbing layer in the packaging bag of the present invention, oxygen absorption capacity can be increased, and edge inactivation at the heat seal part can be substantially prevented. The mechanism of this phenomenon is not clear. However, the present inventors speculate that at least one of the following reasons may be appropriate.

(1) As the layers that make up the packaging bag become wet, oxygen can easily pass therethrough. In this case, the presence of the water vapor absorbing layer is believed to suppress edge inactivation as a result of the prevention of wetting of each layer of the packaging bag and the restriction of the passage of oxygen.

(2) The oxygen-deficient cerium oxide reduces moisture and is consumed, and thus, oxygen absorption capacity may be lost. In this case, since the water vapor absorbing layer is present, it is believed that edge inactivation is suppressed as a result of the prevention of wetting of each of the layers of the packaging bag and the restriction of the passage of oxygen.

(3) Moisture is likely to be adsorbed on the surface of the oxygen-deficient cerium oxide, and the surface of the oxygen-deficient cerium oxide is inactivated. In this case, since the water vapor absorbing layer is present, moisture is reduced, and inactivation of the oxygen-deficient cerium oxide is prevented, whereby it is believed that initial oxygen absorption capacity is preserved and edge inactivation is prevented.

Preferred embodiments of the packaging bag of the present invention will be described below as examples.

Figure 1:
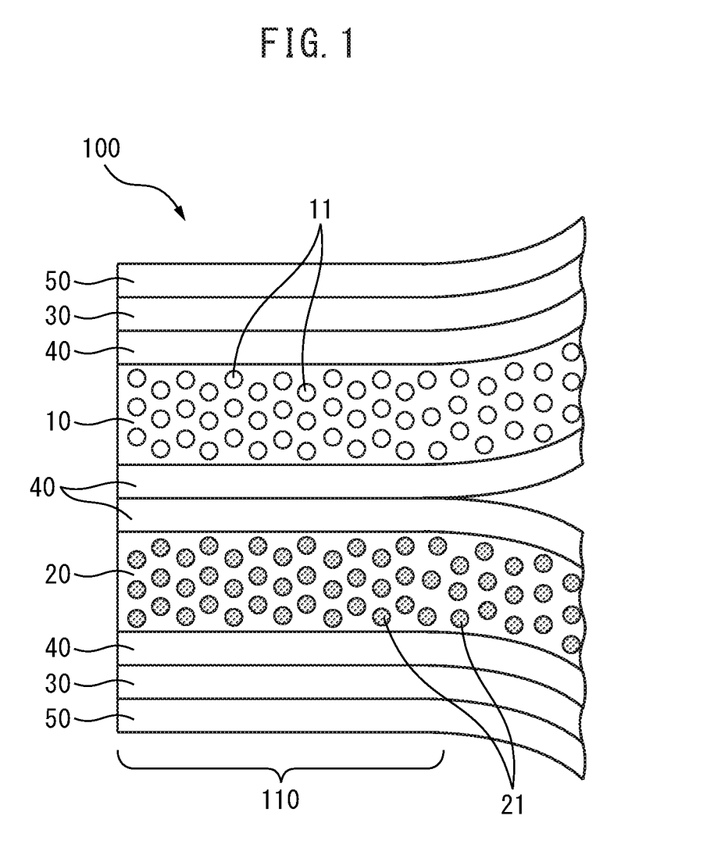
FIG. 1 is a schematic cross-sectional view showing an example of the layer structure in the vicinity of a heat seal part of the packaging bag of the present invention.
Figure 2:
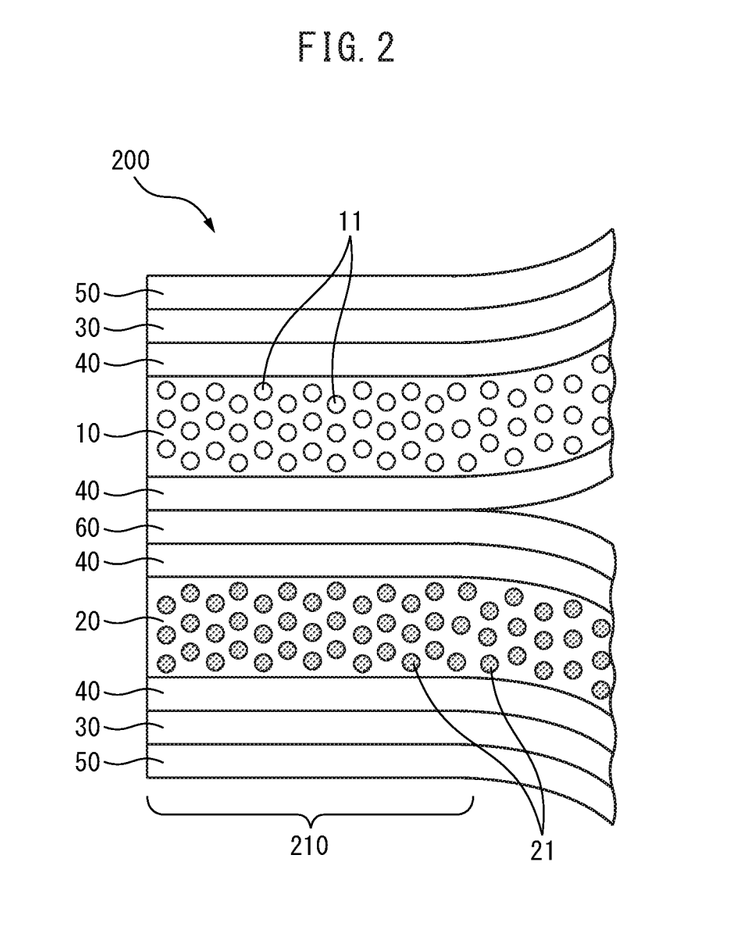
FIG. 2 is a schematic cross-sectional view showing another example of the layer structure in the vicinity of the heat seal part of the packaging bag of the present invention.

FIGS. 1 and 2 are schematic cross-sectional views detailing the layer structure in the vicinity of a heat seal part of the packaging bag of the embodiment of the present invention.

The heat seal part (110) of the packaging bag (100) of FIG. 1 comprises ten layers including a surface resin layer (50), a barrier layer (30), a skin layer (40), an oxygen absorbing layer (10), two skin layers (40), a water vapor absorbing layer (20), a skin layer (40), a barrier layer (30), and a surface resin layer (50) in this order. The heat seal part (110) of the packaging bag (100) comprises a skin layer (40) on both surfaces of the oxygen absorbing layer (10). A skin layer (40) is also included on both surfaces of the water vapor absorbing layer (20). A surface resin layer (50) is included on both outermost layers. The oxygen absorbing layer (10) includes oxygen-deficient cerium oxide (11), and the water vapor absorbing layer (20) includes a water vapor absorbent (21).

The heat seal part (210) of the packaging bag (200) of FIG. 2 comprises eleven layers including a surface resin layer (50), a barrier layer (30), a skin layer (40), an oxygen absorbing layer (10), a skin layer (40), an easy-peel layer (60), a skin layer (40), a water vapor absorbing layer (20), a skin layer (40), a barrier layer (30), and a surface resin layer (50) in this order. The heat seal part (210) of the packaging bag (200) includes a skin layer (40) on both surfaces of the oxygen absorbing layer (10). A skin layer (40) is also included on both surfaces of the water vapor absorbing layer (20). A surface resin layer (50) is included on both outermost layers. The oxygen absorbing layer (10) includes oxygen-deficient cerium oxide (11), and the water vapor absorbing layer (20) includes water vapor absorbent (21).

[Oxygen Absorbing Layer]

The oxygen absorbing layer of the present embodiment includes oxygen-deficient cerium oxide. The oxygen absorbing layer may include a resin in addition to the oxygen-deficient cerium oxide.

(Oxygen-Deficient Cerium Oxide)

The oxygen-deficient cerium oxide may be produced by performing a reduction treatment on cerium oxide $CeO_2$ in a strongly reducing atmosphere to force oxygen atoms out of the crystal lattice of the cerium oxide. The reduction treatment in a strongly reducing atmosphere may be, for example, a heat treatment carried out in the presence of, for example, hydrogen, at a temperature of, for example, 800° C. or more or 900° C. or more, and, for example, 1,500° C. or less or 1,200° C. or less, typically 1,000° C.

Extraction of oxygen atoms from the crystal lattice of cerium oxide in the presence of hydrogen may be, for example, a reaction in accordance with the following formula (1).

$$CeO_2 + xH_2 \rightarrow CeO_{2-x} + xH_2O \qquad (1)$$

The oxygen-deficient cerium oxide described above can absorb oxygen by, for example, a reaction in accordance with the following formula (2)

[Equation 1]

$$CeO_{2-x} + \frac{1}{x}O_2 \rightarrow CeO_2 \qquad (2)$$

x in formulas (1) and (2) described above is a number greater than 0 and equal to or less than 1.0, and may be, for example, a number of 0.1 or more, 0.2 or more, 0.3 or more, or 0.4 or more, and may be, for example, a number of 0.8 or less, 0.7 or less, or 0.6 or less.

The oxygen-deficient cerium oxide does not require moisture mediation to absorb oxygen, as can be understood from formula (2) above. Thus, the packaging bag of the present embodiment, which includes oxygen-deficient cerium oxide in the oxygen absorbing layer, is extremely effective for the storage and preservation of contents which are moisture-averse.

The oxygen-deficient cerium oxide may be a particulate. In this case, the average particle size of the oxygen-deficient cerium oxide may be, for example 100 nm or more, 500 nm or more, or 1 μm or more, and may be, for example, 70 μm or less, 50 μm or less, or 40 μm or less as a median diameter in a particle size distribution determined by a laser diffraction/scattering method.

From the viewpoint of effectively exhibiting the desired oxygen absorption capacity, the content ratio of the oxygen-deficient cerium oxide of the oxygen absorbing layer of the present invention may be 1% by mass or more, 5% by mass or more, 10% by mass or more, or 20% by mass or more, relative to the total mass of the oxygen absorbing layer. Conversely, from the viewpoint of ease of production of the oxygen absorbing layer, the content ratio of the cerium oxide may be 75% by mass or less, 65% by mass or less, 60% by mass or less, 57% by mass or less, 55% by mass or less, 50% by mass or less, 45% by mass or less, or 40% by mass or less, relative to the total mass of the oxygen absorbing layer.

(Resin)

The resin included in the oxygen absorbing layer of the present embodiment may be a thermoplastic resin. The thermoplastic resin used may be suitably selected from among polyolefins, olefin-based copolymers, polyaromatic vinyl compounds, polyesters, ionomer resins, polycarbonates, and polyamides.

The above polyolefin may be, for example, low-density polyethylene (LDPE), linear low-density polyethylene (LLDPE), medium-density polyethylene (MDPE), high-density polyethylene (HDPE), polypropylene, metallocene-catalyzed polypropylene, a propylene-ethylene block copolymer, a propylene-ethylene random copolymer, polymethylpentane, or polyvinyl chloride, or may be a modified product thereof. The polyolefin modified product may be, for example, chlorinated polypropylene, carboxylic acid-modified polyethylene, or carboxylic acid-modified polypropylene.

The olefin-based copolymer may be, for example, an ethylene-vinyl acetate copolymer (EVA), an ethylene-acrylic acid copolymer (EAA), an ethylene-methacrylic acid copolymer (EMAA), an ethylene-ether acrylate copolymer (EEA), or an ethylene-methyl acrylate copolymer (EMAC), or may be a modified product thereof. The olefin-based copolymer modified product may be, for example, carboxylic acid-modified EVA.

Only one type of resin may be used, or a mixture of two or more types may be used.

(Oxygen Absorbing Layer Thickness)

From the viewpoint of preventing loss of the oxygen-deficient cerium oxide, the thickness of the oxygen absorbing layer in the packaging bag of the present embodiment may be, for example, 10 μm or more, 20 μm or more, or 30 μm or more, and from the viewpoint of ensuring adequate heat-sealability when producing the packaging bag, and the thickness may be, for example, 300 μm or less, 200 μm or less, 100 μm or less, 80 μm or less, or 50 μm or less.

[Water Vapor Absorbing Layer]

The water vapor absorbing layer of the packaging bag of the present embodiment may be a resin layer having a water vapor absorption capacity, and may include, for example, a water vapor absorbent and a resin.

(Water Vapor Absorbent)

The water vapor absorbent may be, for example, an inorganic oxide or an inorganic salt.

The inorganic oxide may be, for example, a zeolite, calcium oxide (quick lime), a silica gel, or aluminum oxide. The inorganic salt may be, for example, magnesium sulfate or calcium chloride.

From among the water vapor absorbents described above, a zeolite is suitable. The zeolite may be a natural zeolite, artificial zeolite, or synthetic zeolite. The synthetic zeolite may be a hydrophilic zeolite, and a zeolite appropriately selected from molecular sieves 3A, 4A, 5A, and 13X is preferably used.

The water vapor absorbent may be a particulate. In this case, the average particle size of the water vapor absorbent may be, for example, 100 nm or more, 500 nm or more, or 1 μm or more, and may be, for example, 50 μm or less, 30 μm or less, or 15 μm or less as a median diameter in a particle size distribution determined by a laser diffraction/scattering method.

The content ratio of the water vapor absorbent in the water vapor absorbing layer of the present embodiment may be 1% by mass or more, 5% by mass or more, 10% by mass or more, or 20% by mass or more, and may be 70% by mass or less, 65% by mass or less, 60% by mass or less, or 55% by mass or less, relative to the total mass of the water vapor absorbing layer.

(Resin)

The resin optionally included in the water vapor absorbing layer of the present embodiment may be a thermoplastic resin, and may be appropriately selected from among the examples of the thermoplastic resin in the oxygen absorbing layer described above.

(Water Vapor Absorbing Layer Thickness)

From the viewpoint of preventing loss of the water vapor absorbent, the thickness of the water vapor absorbing layer of the packaging bag of the present embodiment may be, for example, 10 μm or more, 20 μm or more, or 30 μm or more, and from the viewpoint of ensuring adequate heat-sealability when producing the packaging bag, and the thickness may be, for example, 100 μm or less, 95 μm or less, 90 μm or less, 85 μm or less, 80 μm or less, or 75 μm or less.

[Barrier Layer]

The barrier layer of the packaging bag of the present embodiment is a layer which prevents the entry of water vapor and oxygen into the interior of the packaging bag from the outside.

The barrier layer may be, for example, a metal foil or a transparent gas barrier film. The metal foil may be a foil made from, for example, pure aluminum or an aluminum alloy. The transparent gas barrier film may be a resin film such as a polyolefin, vinyl-based polymer, polyester, or polyamide film provided with an inorganic coating film such as an inorganic vapor-deposition film such as an aluminum vapor deposition film, silica vapor deposition film, or alumina vapor deposition film, or a silica/alumina binary vapor deposition film, or an organic coating film such as a polyvinylidene chloride coating film or a polyvinylidene fluoride coating film.

In order to impart appropriate strength to the packaging bag and ensure processability such as heat sealing, the thickness of the barrier layer may be, for example, 5 μm or more or 7 μm or more, and may be, for example, 45 μm or less, 30 μm or less, 20 μm or less, or 10 μm or less. When the packaging bag of the present embodiment comprises, in particular, two or more barrier layers in the heat seal part, the above thickness is the value for a single barrier layer.

[Skin Layer]

The packaging bag of the present embodiment may include a skin layer on one surface or both surfaces of the oxygen absorbing layer, and may include a skin layer on one surface or both surfaces of the water vapor absorbing layer. The skin layer functions to protect the absorbing layers, improve film formation stability, prevent loss of the water vapor absorbent or oxygen-deficient cerium oxide from the absorbing layers, and provide surface smoothness for laminating the absorbing layers with other layers. The skin layer may further have a heat-sealing property so that the packaging bag can be formed by heat sealing.

The skin layer may be composed of, for example, a thermoplastic resin. The thermoplastic resin may be, for example, a polyolefin. The polyolefin may be, for example, low-density polyethylene (LDPE), linear low-density polyethylene (LLDPE), medium-density polyethylene (MDPE), high-density polyethylene (HDPE), polypropylene, metallocene-catalyzed polypropylene, a propylene-ethylene block copolymer, or a propylene-ethylene random copolymer, or may be a modified product thereof. The polyolefin modified product may be, for example, chlorinated polypropylene, carboxylic acid-modified polyethylene, or carboxylic acid-modified polypropylene. One of these thermoplastic resins may be used alone or a mixture of two or more may be mixed and used.

In order to ensure a sufficiently high water vapor absorption rate, the skin layer, when formed into a film having a thickness of 25 μm, may have a water vapor permeability of 5 g/(m$^2$·day) or more, and in order to prevent the loss of absorption capacity in the formation process thereof, may be 100 g/(m$^2$·day) or less, as measured at a temperature of 40° C. and a humidity of 90% RH.

The density of the skin layer may be, for example, 0.85 g/m$^3$ or more or 0.87 g/m$^3$ or more, and may be, for example, 1.5 g/m$^3$ or less or 0.95 g/m$^3$ or less.

In order to effectively prevent loss of the water vapor absorbent or oxygen-deficient cerium oxide, the thickness of the skin layer may be, for example, 2 μm or more, 3 μm or more, 5 μm or more, or 8 μm or more, and in order to ensure adequate heat-sealability and absorption speed, the thickness of the skin layer may be, for example, 20 μm or less, 18 μm or less, 15 μm or less, or 12 μm or less. When the packaging bag of the present embodiment includes two or more skin layers, the above thickness is the value of a single skin layer.

[Surface Resin Layer]

The surface resin layer of the packaging bag of the present embodiment may be arranged on the packaging bag on the outside of the barrier layer (on the side opposite the surface on which the oxygen absorbing layer and the water vapor absorbing layer are arranged) in order to protect the barrier layer and maintain the barrier property, as well as to impart appropriate strength as a film and the rigidity necessary during processing to the laminate film constituting the packaging bag of the present embodiment.

The surface resin layer of the packaging bag of the present embodiment may be a single-layer or multilayer film composed of a polyester-based resin film, a polyamide-based resin film, or a polyolefin-based resin film. Printing may be performed on the surface resin layer.

The polyester-based resin film may be a film composed of, for example, polyethylene terephthalate. The polyamide-based resin film may be a film composed of, for example, various nylons. The polyolefin-based resin film may be a film composed of, for example, a polyethylene-based resin, a polypropylene-based resin, or a cyclic polyolefin resin. These films may be biaxially stretched in order to further improve the heat resistance and impact resistance of the obtained packaging bag.

In order to sufficiently protect the barrier layer, and to impart appropriate strength and rigidity, the thickness of the surface resin layer may be, for example, 2 μm or more, 3 μm or more, 5 μm or more, or 8 μm or more, and in order to prevent excessive increasing the total thickness of the obtained packaging bag, the thickness of the surface resin layer may be, for example, 20 μm or less, 18 μm or less, or 15 μm or less. When the packaging bag of the present embodiment includes two or more surface resin layers, the above thickness is the value of a single surface resin layer.

[Layer Having Easy-Peel Function]

Regarding the layer having an easy-peel function, at least one of the oxygen absorbing layer, the water vapor absorbing layer, and the skin layer, when present, may have an easy-peel function in some cases, or a layer having an easy-peel function other than these layers may be separately included. When a layer having an easy-peel function other than these layers is separately included, the layer is preferably arranged between the oxygen absorbing layer and the water vapor absorbing layer. In particular, the layer having an easy-peel function may be an easy-peel sealant layer, which has both an easy-peel function and heat-sealability. "Easy-peel function" means a peeling strength in the range of 1 to 10 N/15 mm when peeling and opening the packaging bag, as measured in accordance with JIS K6854-3.

The easy-peel sealant layer may be, for example, a laminate having a cohesive-peeling layer composed of a resin having a sea-island structure mixed with resins having different compositions, or may be a multilayer resin laminate in which at least one of the outermost layers has heat-sealability, and which delaminates upon opening.

A commercially available product may be used as the easy-peel sealant. For example, the easy-peel sealant layer may be appropriately selected from the products named "IMX film", "VMX film", "LCX film", and "SMX film" manufactured by J-Film Corporation; the product named "VMX™" manufactured by Mitsui Chemical Co., Ltd.; the products named "CMPS™" and "T.A.F™" manufactured by Tohcello Co., Ltd; products from the "Assist AE" series, the "Assist M" series, and the "Assist P" series manufactured by Sumika Plastech Co., Ltd; and the product named "Suntox-CP" manufactured by Suntox, Co., Ltd.

The thickness of the layer having the easy-peel function, in particular, the easy-peel sealant layer, may be, for example, 5 μm or more, 10 μm or more, 15 μm or more, or 20 μm or more, and may be, for example, 100 μm or less, 50 μm or less, or 40 μm or less.

[Packaging Bag Layer Structure]

The packaging bag of the present embodiment may be configured such that:

an oxygen absorbing laminate film comprising a barrier layer and an oxygen absorbing layer, and a water vapor absorbing laminate film comprising a barrier layer and a water vapor absorbing layer, are arranged opposite to each other so that the oxygen absorbing layer and the water vapor absorbing layer are located inwardly, and edges of the oxygen absorbing laminate film and the water vapor absorbing laminate film are heat-sealed to form a bag shape.

By configuring the packaging bag in this manner, since both the oxygen absorbing layer and the water vapor absorbing layer are arranged near the interior of the packaging bag, both the oxygen concentration and humidity inside the packaging bag can be effectively reduced, and edge inactivation can be prevented. When both the oxygen absorbing layer and the water vapor absorbing layer are arranged together on either side of the laminated film, though edge inactivation can be prevented, either the oxygen absorbing layer or the water vapor absorbing layer faces the interior of the packaging bag via the other absorbing layer, and there is a risk that absorption may be impaired. For example, in a packaging bag comprising a multilayer film including a barrier layer, an oxygen absorbing layer, and a water vapor absorbing layer in this order, and a multilayer film including a barrier layer, which are arranged opposite each other so that the water vapor absorbing layer is arranged inside and the edges of which are heat-sealed to form a bag shape, the oxygen absorbing layer faces the inside of the packaging bag via the water vapor absorbing layer, and thus, there is a risk that the oxygen absorption capacity will be impaired.

The oxygen absorbing laminate film and the water vapor absorbing laminate film are selected so that a heat seal part in which the edges are heat-sealed with the oxygen absorbing layer and the water vapor absorbing layer located inwardly, as in the configuration described above, and heat-sealed. Thus, the oxygen absorbing laminate film may further include a skin layer on one surface or on both surfaces of the oxygen absorbing layer, and the water vapor absorbing laminate film may further include a skin layer on one surface or on both surfaces of the water vapor absorbing layer. The oxygen absorbing laminate film and the water vapor absorbing laminate film may further include surface resin layers on the sides opposite the side of the respective absorbing layer with respect to the barrier layers.

When the heat-seal part of the packaging bag of the present invention includes a layer having an easy-peel function, either the oxygen absorbing laminate film or the water vapor absorbing laminate film may further have the layer having the easy-peel function on each absorbing layer or on the surface of the skin layer, when present.

<Packaging Bag Manufacturing Method>

The packaging bag of the present embodiment may be produced by, for example:

a method including the steps of:

preparing an oxygen absorbing laminate film comprising a barrier layer and an oxygen absorbing layer, and a water vapor absorbing laminate film comprising a barrier layer and a water vapor absorbing layer (multilayer film preparation step), arranging the oxygen absorbing laminate film and the water vapor absorbing laminate film opposite each other so that the oxygen absorbing layer and the water vapor absorbing layer are located inwardly (arrangement step), and heat-sealing the edges of the oppositely-arranged oxygen absorbing film and water vapor absorbing film to form a bag shape (heat-sealing step).

[Multilayer Film Preparation Step]

In the packaging bag manufacturing method of the present embodiment, first, an oxygen absorbing laminate film comprising a barrier layer and an oxygen absorbing layer, and a water vapor absorbing laminate film comprising a barrier layer and a water vapor absorbing layer are prepared. The oxygen absorbing laminate film and the water vapor absorbing laminate film may further include the optional layer described above in addition to these layers.

(Oxygen Absorbing Layer Manufacturing Method)

The oxygen absorbing layer can be obtained by forming a composition obtained by premixing oxygen-deficient cerium oxide and a thermoplastic resin, when used, as necessary into a film shape by a suitable method, such as press molding, extrusion molding, or injection molding. The extrusion molding may be, for example, an inflation method or a T-die method. From among these, the inflation method and the T-die method are convenient. When a skin layer is arranged on one surface or both surfaces of the oxygen absorbing layer, it is convenient to use a coextrusion inflation method or T-die method when producing the oxygen absorbing layer, and to form a film by combining the desired skin layers with the oxygen absorbing layer.

(Water Vapor Absorbing Layer Manufacturing Method)

The water vapor absorbing layer can be obtained following the same procedure as the case of the oxygen absorbing layer using a water vapor absorbent and a thermoplastic resin, when used. When a skin layer is arranged on one surface or both surfaces of the water vapor absorbing layer, it is similarly convenient to use a coextrusion inflation method or T-die method when producing the water vapor absorbing layer, and to form a film by combining the desired skin layers with the water vapor absorbing layer.

(Lamination of Each Layer)

The lamination of each layer of the oxygen absorbing laminate film and the water vapor absorbing laminate film may be carried out by suitably adopting a known sandwiching lamination method, dry lamination method, or coextrusion method.

[Arrangement Step]

Next, in the arrangement step, the oxygen absorbing laminate film and the water vapor absorbing laminate film are arranged opposite each other so that the oxygen absorbing layer and the water vapor absorbing layer are located inwardly. When these films include easy-peel sealant layers, the easy-peel sealant layers are arranged innermost, and when an easy-peel sealant layer is not included and skin layers are included, the skin layers are arranged innermost.

[Heat-Sealing Step]

In the heat-sealing step, the edges of the oppositely-arranged oxygen absorbing laminate film and the water vapor absorbing laminate film are heat-sealed to form a bag shape, whereby the packaging bag of the present embodiment can be obtained.

The heat-sealing may be suitably carried out by any known method. The heat-sealing width may be, for example, 3 mm or more, 5 mm or more, or 7 mm or more, and may be, for example, 20 mm or less, 15 mm or less, or 12 mm or less.

<Contents-Containing Packaging Bag>

The present invention provides a contents-containing packaging bag.

In certain embodiments of the present invention, the contents-containing packaging bag includes, for example, the packaging bag of the present embodiment, as described above, and contents which are sealed in the packaging bag.

The contents of the contents-containing packaging bag may be selected from foodstuffs, medicine, medical equipment, medical instruments, electronic components, precision machines, and recording materials. When the contents are medicine or medical instruments, the effect of the present invention is maximally exhibited, which is preferable.

EXAMPLES

1. Production of Oxygen Absorbing Laminate Film 1

(1) Production of Oxygen Absorbing Layer Composition

Oxygen absorbing layer composition pellets were produced by kneading 55 parts by mass of oxygen-deficient cerium oxide $CeO_{2-x}$ (x=0.5) and 45 parts by mass of LDPE using a twin-screw extruder and thereafter extruding.

(2) Production of Oxygen Absorbing Layer Having Skin Layers on Both Surfaces

A three-layer film having a layer structure of 20 μm skin layer/35 μm oxygen absorbing layer/20 μm skin layer was produced by coextrusion molding using an air-cooled inflation molding machine for two-type three-layer films.

The oxygen absorbing layer composition pellets obtained in (1) above were used for the oxygen absorbing layer. LLDPE (product name "Evolue-SP2520" manufactured by Prime Polymer Co., Ltd.) was used for both of the skin layers.

(3) Barrier Layer Laminate

An aluminum foil having a thickness of 9 μm as the barrier layer, and a polyethylene terephthalate film having a thickness of 12 μm as the surface rasin layer, were prepared. These aluminum foil and polyethylene terephthalate film were dry laminated to obtain a multilayer film having a layer structure of 12 μm PET/9 μm aluminum foil. An oxygen absorbing laminate film 1 having the layer structure below was produced by sandwich laminating the aforementioned oxygen absorbing layer having skin layers on both surfaces thereof onto the surface of the aluminum foil of the multilayer film, using LDPE (product name "Suntech LD (L1850K)" manufactured by Asahi Kasei Co., Ltd.) as an adhesive resin:

12 μm PET/9 μm aluminum foil/15 μm adhesive resin/20 μm skin layer/35 μm oxygen absorbing layer/20 μm skin layer.

2. Production of Water Vapor Absorbing Laminate Film 1

(1) Production of Water Vapor Absorbing Layer Composition

Water vapor absorbing layer composition pellets were produced by kneading 55% by mass of a zeolite (product name "Molecular Sieve 3A" manufactured by Union Showa Co., Ltd.), and 45 parts by mass of an ethylene/methacrylate copolymer (product name "Nucrel 4214C" manufactured by Mitsui-Dupont Polychemical Co., Ltd.) using a twin-screw extruder and thereafter extruding.

(2) Production of Water Vapor Absorbing Layer Having Skin Layers on Both Surfaces A three-layer film having a layer structure of 10 μm skin layer/60 μm water vapor absorbing layer/10 μm skin layer was produced by coextrusion molding using an air-cooled inflation molding machine for two-type three-layer films.

The water vapor absorbing layer composition pellets obtained in (1) above were used in the water vapor absorbing layer. LLDPE (product name "Evolue-SP2520" manufactured by Prime Polymer Co., Ltd.) was used in both of the skin layers.

(3) Barrier Layer Laminate

An aluminum foil having a thickness of 9 μm as the barrier layer, and a polyethylene terephthalate film having a thickness of 12 μm as the surface resin layer, were prepared. These aluminum foil and polyethylene terephthalate film were dry laminated to obtain a multilayer film having a layer structure of 12 μm PET/9 μm aluminum foil. A water vapor absorbing laminate film 1 having the layer structure below was produced by sandwich laminating the aforementioned water vapor absorbing layer having skin layers on both surfaces thereof onto the surface of the aluminum foil of the multilayer film, using LDPE (product name "Suntech LD (L1850K)" manufactured by Asahi Kasei Co., Ltd.) as an adhesive resin:

12 μm PET/9 μm aluminum foil/15 μm adhesive resin/10 μm skin layer/60 μm water vapor absorbing layer/10 μm skin layer.

3. Production of Water Vapor Absorbing Laminate Film 2

An easy-peel sealant film manufactured by J-Film Co., Ltd., product name "IMX-L" (thickness 30 μm), was used as the easy-peel layer. A water vapor absorbing laminate film 2 having an easy-peel layer was obtained by dry laminating the above easy-peel layer onto the outermost skin layer of the water vapor absorbing laminate film 1 obtained in 2 above. The multilayer film 2 had the following layer structure:

12 μm PET/9 μm aluminum foil/15 μm adhesive resin/10 μm skin layer/60 μm water vapor absorbing layer/10 μm skin layer/30 μm easy-peel layer.

In the above description, the symbol "II" represents dry lamination (the same is true hereinafter).

4. Comparative Example Multilayer Film 1

A three-layer film having a layer structure of 12 um PET/9 um aluminum foil/40 um LLDPE layer was used as the Comparative Example multilayer film 1.

5. Production of Comparative Example Multilayer Film 2

A Comparative Example multilayer film 2 having an easy-peel layer was produced by dry laminating an easy-peel layer on the LLDPE layer side of the Comparative Example multilayer film 1 of 4 above. The Comparative Example multilayer film 2 had the following layer structure:

12 μm PET/9 μm aluminum foil/40 μm LLDPE/30 μm easy-peel layer.

An easy-peel sealant film manufactured by J-Film Co., Ltd., product name "IMX-L" (thickness 30 μm), was used as the easy-peel layer.

Example 1

A four-way sealed packaging bag was produced by overlapping the oxygen absorbing laminate film 1 obtained in 1 above and the water vapor absorbing laminate film 1 obtained in 2 above so that the skin layers contacted each other, and heat-sealing the four sides at a seal width of 10 mm using an impulse sealer.

The packaging bag obtained as described above was placed into a constant temperature and humidity chamber, removed after 7 days had elapsed, the heat seal part was removed, and the inactivation distance of the edge inactivation was measured. The constant temperature and humidity chamber was set the internal temperature at 40° C., and the internal humidity was set to two-level humidity of 30%-RH and 75%-RH.

"Inactivation distance" is the distance from the edge of the heat seal part of the packaging bag toward the interior of the packaging bag in which the oxygen absorption capacity of the oxygen absorbing layer was inactivated.

The inactivation distance is measured using the change in color when the oxygen-deficient cerium oxide in the oxygen absorbing layer of the oxygen absorbing laminate film 1 changed to non-oxygen-deficient cerium oxide by the chemical reaction represented by the formula (2).

[Formula 2]

$$CeO_{2-x} + \frac{1}{x}O_2 \rightarrow CeO_2 \quad (2)$$

$x = 0.5$, Pale Yellow Color
Dark Blue Color

Comparative Example 1

A four-way sealed packaging bag was produced by overlapping the oxygen absorbing laminate film 1 obtained in 1 above and the Comparative Example multilayer film 1 of 4 above so that the skin layer of the oxygen absorbing laminate film and the LLDPE layer of the Comparative Example multilayer film 1 contacted each other, and heat-sealing the four sides at a seal width of 10 mm using an impulse sealer. Evaluation was performed in the same manner as Example 1.

Example 2

A four-way sealed packaging bag was produced by overlapping the oxygen absorbing laminate film 1 obtained in 1 above and the water vapor absorbing laminate film 2 obtained in 3 above so that the skin layer of the oxygen absorbing laminate film and the easy-peel layer of the water vapor absorbing laminate film 2 contacted each other, and heat-sealing the four sides at a seal width of 10 mm using an impulse sealer. Evaluation was performed in the same manner as Example 1.

Comparative Example 2

A four-way sealed packaging bag was produced by overlapping the oxygen absorbing laminate film 1 obtained in 1 above and the Comparative Example multilayer film 2 obtained in 5 above so that the skin layer of the oxygen absorbing laminate film and the easy-peel layer of the Comparative Example multilayer film 2 contacted each other, and heat-sealing the four sides at a seal width of 10 mm using an impulse sealer. Evaluation was performed in the same manner as Example 1.

Figure 3:
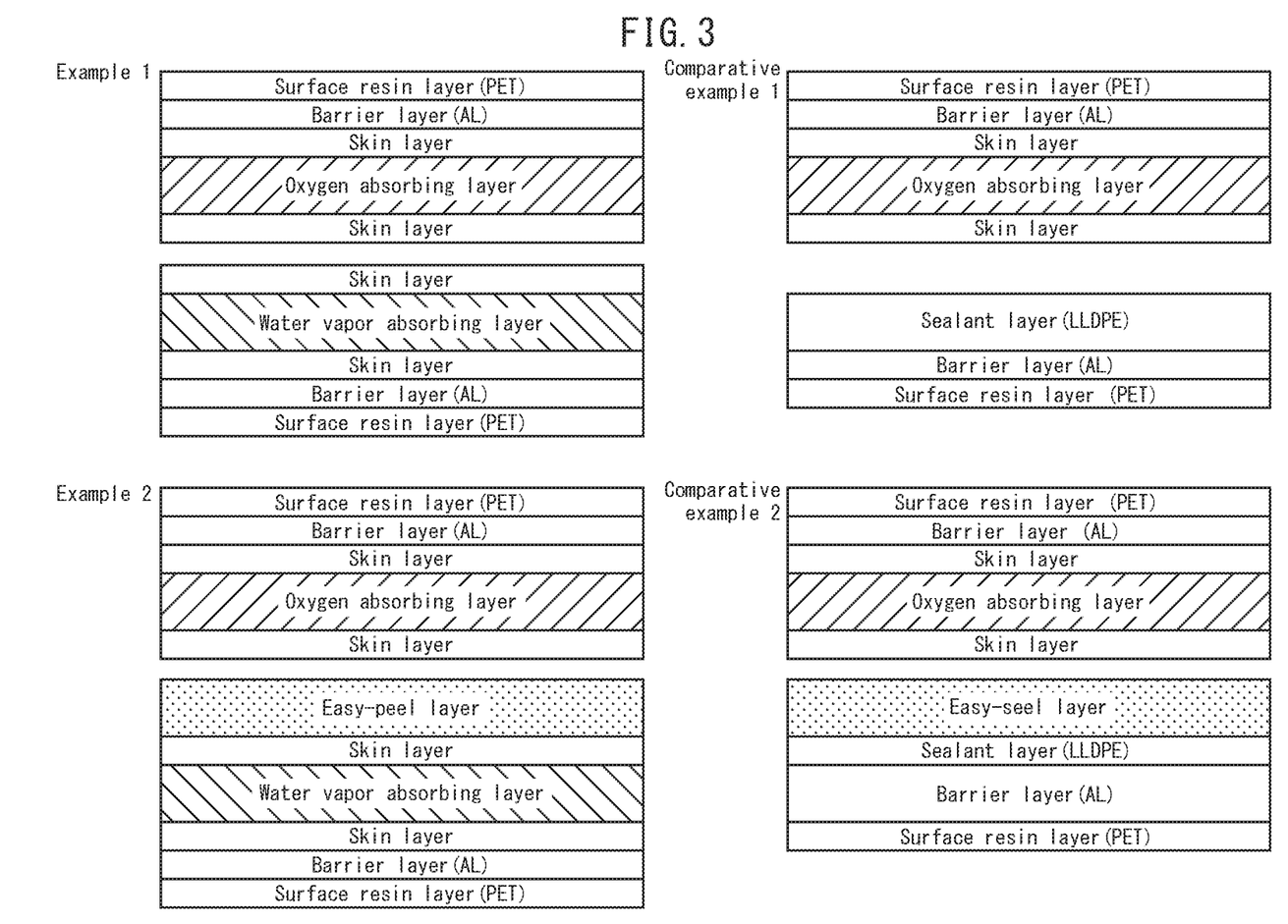
FIG. 3 is a schematic cross-sectional view showing the structures of laminated films used for manufacturing the packaging bags of the Examples and the Comparative Examples.

The evaluation results of the Examples and Comparative Examples are shown in Table 1. The layer structure of each multilayer film indicated by abbreviation in Table 1 is shown in Table 2. The layer structure of each multilayer film used in the Examples and Comparative Examples is shown in FIG. 3.

TABLE 1

| | Packaging Bag Structure | | Heat Seal Part Structure | | | | Inactivation Distance of Edge Inactivation (mm) | | | |
| | | | | | | | | After 7 Days | | |
| | Multilayer Film (1) | Multilayer Film (2) | Oxygen Absorbing Layer | Water Vapor Absorbing Layer | Barrier Layer | Easy-peel Layer | Initial | 40° C. 30%-RH | 40° C. 75%-RH | Difference [(40° C., 75%-RH) − (40° C., 30%-RH)] |
|---|---|---|---|---|---|---|---|---|---|---|
| Ex 1 | Oxygen Absorbing Laminate Film 1 | Water Vapor Absorbing Laminate Film 1 | Present | Present | Present | Absent | 0 | 0.7 | 0.7 | 0.0 |
| Comp Ex 1 | Oxygen Absorbing Laminate Film 1 | Comparative Example Laminate Film 1 | Present | Absent | Present | Absent | 0 | 0.8 | 1.0 | 0.2 |
| Ex 2 | Oxygen Absorbing Laminate Film 1 | Water Vapor Absorbing Laminate Film 2 | Present | Present | Present | Present | 0 | 0.8 | 0.8 | 0.0 |
| Comp Ex 2 | Oxygen Absorbing Laminate Film 1 | Comparative Example Laminate Film 2 | Present | Absent | Present | Present | 0 | 0.9 | 1.2 | 0.3 |

TABLE 2

| Multilayer Film Name | Layer Structure |
|---|---|
| Oxygen Absorbing Laminate Film 1 | PET (12)// Al (9)/Adhesive Resin (15)/ Skin Layer (20)/Oxygen Absorbing Layer (35)/Skin Layer (20) |
| Water Vapor Absorbing Laminate Film 1 | PET (12)// Al (9)/Adhesive Resin (15)/ Skin Layer (10)/Water Vapor Absorbing Layer (60)/Skin Layer (10) |
| Water Vapor Absorbing Laminate Film 2 | PET (12)// Al (9)/Adhesive Resin (15)/ Skin Layer (10)/Water Vapor Absorbing Layer (60)/Skin Layer (10)// Easy-peel Layer (30) |
| Comparative Example Laminate Film 1 | PET (12)// Al (9)// LLDPE (40) |
| Comparative Example Laminate Film 2 | PET (12)// Al (9)// LLDPE (40)// Easy-peel Layer (30) |

Note:
The parenthesized numbers represent the thicknesses of the layers.

According to the results in Table 1, the packaging bag of the prior art had a greater edge inactivation distance under high humidity conditions (40° C., 75% RH) as compared to under low humidity conditions (40° C., 30% RH), and it was verified that the edge inactivation distance of the packaging bag of the present embodiment did not depend on the humidity level.

Example 3

The oxygen absorbing laminate film 2 obtained in 2 above and the water vapor absorbing laminate film 1 obtained in 3 above were each cut into a 65 mm×65 mm square. The cut pieces thereof were overlapped so that the skin layers thereof contacted each other, and three sides were heat-sealed using an impulse sealer. A small humidity data logger was inserted into the bag from the opening on the unsealed side, and thereafter the open side was heat-sealed in the direction perpendicular to the sealing direction of the opposite side to form a tetrahedral bag in which the small humidity data logger described above was enclosed.

The tetrahedral bag obtained as described above was allowed to stand in an environment of a temperature of 23° C. and a humidity of 50%-RH, and the internal humidity and oxygen absorption amount were measured by the following methods.

Humidity: According to the display of the data logger enclosed in the tetrahedral bag.

Oxygen Absorption Amount: Calculated from oxygen concentration measured by piercing the tetrahedral bag with the measuring valve of a galvanic cell-type oxygen sensor product name "Pakmaster RO-103" manufactured by Iijima Electronics Co., Ltd.

The display of the data logger three hours after the start of measurement was 0. At this time, it was believed that the humidity had already fallen below the measurement limit. After 7 days from the start of measurement had elapsed, the oxygen absorption amount was 0.07 mL/cm$^2$. Thus, it was confirmed that the packaging bag of the present invention demonstrated excellent oxygen absorption performance even though the water vapor absorbing layer was present, and displayed excellent oxygen absorption performance even in a low humidity environment.

REFERENCE SIGNS LIST 10 oxygen absorbing layer
11 oxygen-deficient cerium oxide
20 water vapor absorbing layer
21 water vapor absorbent
30 barrier layer
40 skin layer
50 surface resin layer
60 easy-peel layer
100 packaging bag
110 heat seal part
200 packaging bag
210 heat seal part

The invention claimed is:

1. A packaging bag having on an edge thereof a heat seal part with which the packaging bag is formed into a bag shape, said packaging bag comprising:
   an oxygen absorbing laminate film comprising a barrier layer and an oxygen absorbing layer, wherein the oxygen absorbing layer comprises an oxygen-deficient cerium oxide, and
   a water vapor absorbing laminate film comprising a barrier layer and a water vapor absorbing layer,
   wherein the oxygen absorbing laminate film and the water vapor absorbing laminate film are arranged opposite to each other so that the oxygen absorbing layer and the water vapor absorbing layer are located inwardly such that neither the oxygen absorbing layer nor the water vapor absorbing layer faces the interior of the packaging bag via the other absorbing layer, and
   wherein edges of the oxygen absorbing laminate film and the water vapor absorbing laminate film are heat-sealed to form the heat seal part and thereby form a bag shape.

2. The packaging bag according to claim 1, wherein the water vapor absorbing layer comprises a zeolite.

3. The packaging bag according to claim 1, wherein the heat seal part comprises a barrier layer, an oxygen absorbing layer, a water vapor absorbing layer, and a barrier layer in this order.

4. The packaging bag according to claim 1, wherein the heat seal part includes a layer having an easy-peel function.

5. The packaging bag according to claim 1, wherein a skin layer is included on one surface or both surfaces of the oxygen absorbing layer.

6. The packaging bag according to claim 1, wherein a skin layer is included on one surface or both surfaces of the water vapor absorbing layer.

7. A method for manufacturing the packaging bag according to claim 1, comprising:
   preparing an oxygen absorbing laminate film comprising a barrier layer and an oxygen absorbing layer, and a water vapor absorbing laminate film comprising a barrier layer and a water vapor absorbing layer,
   arranging the oxygen absorbing laminate film and the water vapor absorbing laminate film opposite each other so that the oxygen absorbing layer and the water vapor absorbing layer are located inwardly, and
   heat sealing the edges of the oppositely-arranged oxygen absorbing film and water vapor absorbing film to form a heat seal part and thereby form a bag shape.

8. The method according to claim 7, wherein the water vapor absorbing layer comprises a zeolite.

9. The method according to claim 7, wherein the heat seal part includes a layer having an easy-peel function.

10. A contents-containing packaging bag, comprising the packaging bag according to claim 1, and
    contents which are sealed in the packaging bag.

11. The contents-containing packaging bag according to claim 10, wherein the contents are foodstuffs, a medicine, a medical equipment, medical instruments, electronic components, precision machines, and recording materials.

12. The contents-containing packaging bag according to claim 11, wherein the contents are a pharmaceutical or a medical instrument.

13. The packaging bag according to claim 1, wherein
the oxygen absorbing laminate film comprises, in this order, a surface resin layer, the barrier layer, a first skin layer, the oxygen absorbing layer, and a second skin layer,
the water vapor absorbing laminate film comprises, in this order, a surface resin layer, the barrier layer, a first skin layer, the water vapor absorbing layer, and a second skin layer, and
wherein, at the heat seal part, the second skin layer of the oxygen absorbing laminate film is in contact with the second skin layer of the water vapor absorbing laminate film.

14. The packaging bag according to claim 1, wherein
the oxygen absorbing laminate film comprises, in this order, a surface resin layer, the barrier layer, a first skin layer, the oxygen absorbing layer, and a second skin layer,
the water vapor absorbing laminate film comprises, in this order, a surface resin layer, the barrier layer, a first skin layer, the water vapor absorbing layer, a second skin layer, and an easy peel layer, and
wherein, at the heat seal part, the second skin layer of the oxygen absorbing laminate film is in contact with the easy peel layer of the water vapor absorbing laminate film.

* * * * *